Aug. 29, 1933.    S. M. RUBIN    1,924,755

LEDGER CARD

Filed Feb. 17, 1932

Inventor
S. M. Rubin

Witness
H. Woodard

By H. B. Willson & Co.
Attorneys

Patented Aug. 29, 1933

1,924,755

UNITED STATES PATENT OFFICE 1,924,755

LEDGER CARD

Samuel M. Rubin, Kansas City, Mo.

Application February 17, 1932. Serial No. 593,607

1 Claim. (Cl. 283—66)

The invention relates to ledger cards for use by retail credit establishments in keeping accounts upon which weekly or monthly installments are to be paid. Under present practices with establishments handling appreciable volumes of charge accounts, large auditing departments are necessary to continually separate past-due accounts from up-to-date accounts in order that they may be turned over to collection departments for proper attention, and it is often as long as five or six weeks after their payments become past due, that delinquents are notified. Under such circumstances, knowing that any payment not made on time will not be called to their attention for several weeks, numerous customers are prone to become increasingly delinquent, not only impairing their credit, but placing such a burden on the collection department as to necessitate great expense in connection therewith.

It is known that if reminders of past-due payments be mailed within only a few days of the due date, the customers soon learn that their accounts are under strict scrutiny and they will consequently be much more prompt in making payments. It is to enable this to be readily accomplished that the present invention has been devised, and due to said invention, the ledger cards of delinquents may be so easily located at any time, that the credit manager himself may well attend to locating said cards and turning them over to the collection department. Prompt reminders may thus be sent, the customers will become more prompt with their installments, neither auditing nor collection department need be as large, and the difference in expense may react to the patrons' advantage in lower prices.

With the foregoing in view, the invention resides in the novel subject matter hereinafter described and claimed, description being accomplished by reference to the accompanying drawing.

Fig. 1 is a perspective view showing a number of the cards substantially as they would appear in a tray or drawer of a filing cabinet.

Fig. 2 is a fragmentary perspective view showing the reverse side of the cards shown in Fig. 1.

The ledger cards 5 shown in Figs. 1 and 2, are duplicates, and a description of one will suffice. This card is provided with numerous blank spaces to receive the customer's name, address, terms of payment, dates of payments, credits, balances, etc., and the back of the card is preferably a substantial duplicate of its front. Along one of its vertical edges, the card 5 is provided with a series of integral tabs 6 surrounded on three sides by perforations 7 so that they may readily be torn from said card. At the other vertical edge of the card 5, is another series of tabs $6^a$ having perforations $7^a$ along three sides. The obverse sides of the tabs 6 and the reverse sides of the tabs $6^a$ are provided with consecutive numbers corresponding with usual sub-divisions of a year (weeks or months). In the present showing, the obverse sides of the tabs 6 bear the numbers 1 to 26, and the reverse sides of the tabs $6^a$ bear the numbers 27 to 52, denoting the fifty-two weeks of the year. The obverse sides of the tabs $6^a$ and the reverse sides of the tabs 6 may also bear the numbers 1 to 52, if desired.

The card 5 is of course used with its obverse side disposed forwardly for the first twenty-six weeks of the year, and reversed for the rest of the year. Whenever an account is opened, one of the ledger cards 5 is properly filled out and the payment made, the date, etc., are placed in the proper blank spaces. The tab having the number corresponding to the number of the week on which the first payment was made, is torn from the card, and as the succeeding weekly payments are made, the following tabs are successively torn from the card. Thus, the card is kept in such condition that it will show at any time whether the customer be up-to-date or delinquent with payments. For example, attention is invited to Fig. 1 of the drawing which shows that three customers whose ledger cards are illustrated, are up-to-date with payments, having paid for the twelfth week. Two of the customers however have not paid for the ninth, tenth, eleventh and twelfth weeks, one has not paid for the eleventh and twelfth weeks, and one has paid all but the twelfth week. By glancing along a drawer or tray filled with the cards, it may be seen at a glance wherever the card of a delinquent exists, and all of these cards may be removed and turned over to the collection department for attention. Such "spotting" and removal of the ledger cards of delinquents may be so quickly and easily accomplished at any desired time, that the credit manager himself may well attend to this duty.

By having the tabs 6 and $6^a$ numbered on both their obverse and reverse sides, as herein shown, the tabs may be torn either from the left or right hand edge of the card, as may be most desirable.

The preferred use of the cards is in connection with a filing drawer having vertical edges to abut the vertical edges of a plurality of the cards standing in a front-to-rear row in said drawer, and attention is invited to the fact that the series of removable tabs, are so located that even if all of said tabs be removed, the card will still possess vertical edge portions exactly the same distance apart horizontally, as they were before any of the tabs were removed. Thus, these vertical edge portions, regardless of how many tabs have been removed, may always serve to abut the sides of the drawer to hold the various cards in strict front-to-rear alinement, as seen in the drawing. Thus by simply sighting through the notches formed by removal of the tabs, any tabs projecting into said notches, immediately identify the cards of delinquents so that these cards can be removed from the drawer and reminders immediately sent. Were the severable tabs not so located that their removal could not decrease the horizontal distance between the drawer abutting portions of the vertical edges of the cards, said cards could not be held in strict front-to-rear alinement and consequently delinquents' cards could not be located in the manner explained.

In both forms of construction herein illustrated, the ledger cards are intended for accounts on which weekly payments are to be made, and hence fifty-two of the tabs are provided, corresponding to the fifty-two weeks of the year. For accounts on which only monthly payments are to be made however, the cards could be provided only with twelve tabs corresponding to the twelve months.

It will be seen from the foregoing that novel and advantageous provision has been made for carrying out the object of the invention, and while excellent results are obtainable from the details disclosed, minor variations may of course be made within the scope of the invention as claimed.

I claim:—

A ledger card upon which to record payments made on an installment account, said card having upper and lower horizontal edges and right and left vertical edges, the upper and lower portions of said vertical edges being adapted to abut the sides of a filing drawer, said card having a row of tabs severably connected therewith and adapted for removal consecutively as installments are paid, said series of tabs extending along at least one of said vertical edges but terminating in vertically spaced relation with said upper and lower edges so that removal of any or all of said tabs cannot decrease the horizontal distance between said drawer-abutting portions of said vertical edges, whereby a plurality of said cards may stand in a front-to-rear row in a filing drawer and may be held in strict front-to-rear alinement by the sides of the drawer, and mere sighting rearwardly through the notches formed in the cards by consecutive removal of their tabs, will disclose the unremoved tabs of delinquents' cards.

SAMUEL M. RUBIN.